US009697018B2

United States Patent
Brutschy et al.

(10) Patent No.: US 9,697,018 B2
(45) Date of Patent: Jul. 4, 2017

(54) SYNTHESIZING INPUTS TO PRESERVE FUNCTIONALITY

(71) Applicant: International Business Machines Corporation, Armonk, NY (US)

(72) Inventors: Lucas Brutschy, Zurich (CH); Pietro Ferrara, White Plains, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/724,958

(22) Filed: May 29, 2015

(65) Prior Publication Data

US 2016/0350155 A1 Dec. 1, 2016

(51) Int. Cl.
*G06F 9/50* (2006.01)
*G06F 9/445* (2006.01)
(Continued)

(52) U.S. Cl.
CPC .......... *G06F 9/44589* (2013.01); *G06F 8/443* (2013.01); *G06F 8/49* (2013.01); *G06N 5/006* (2013.01); *G06F 21/54* (2013.01)

(58) Field of Classification Search
CPC .......... G06F 9/44589; G06F 8/49; G06F 8/52; G06F 21/54; G06N 5/00; G01R 31/318357
See application file for complete search history.

(56) References Cited

U.S. PATENT DOCUMENTS 7,509,251 B2 3/2009 Andrews et al.
7,587,636 B2 9/2009 Tillmann et al.
(Continued)

FOREIGN PATENT DOCUMENTS

WO 2014117387 A1 8/2014

OTHER PUBLICATIONS

Chakrabortyet al., "ipShield: A Framework for Enforcing Context-Aware Privacy", Proceedings of the 11th USENIX Symposium on Networked Systems Design and Implementation (NSDI '14), Apr. 2-4, 2014, 15 pages, Seattle, WA, ISBN: 978-1-931971-09-6.
(Continued)

*Primary Examiner* — Lewis A Bullock, Jr.
*Assistant Examiner* — Gilles Kepnang
(74) *Attorney, Agent, or Firm* — Mark G. Edwards

(57) ABSTRACT

A computer implemented method of preserving functionality in a computer program by generating customized mock inputs may include identifying a set of functionalities of the computer program, where a first functionality has a first input, and a second functionality has a second input. The method may also include determining a first and a second constraint respectively on the first and second inputs, where the first constraint defines a set of values of the first input which enables the first functionality, and the second constraint defines a set of values of the second input which enables the second functionality. The method may then include generating a constraint satisfaction problem including the first and second constraints, and determining whether a tuple of mock input values exists that satisfy the constraint satisfaction problem. The method may additionally include providing the tuple to the computer program as the customized mock inputs.

16 Claims, 4 Drawing Sheets

(51) Int. Cl.
*G06F 9/45* (2006.01)
*G06N 5/00* (2006.01)
*G06F 21/54* (2013.01)

(56) References Cited

U.S. PATENT DOCUMENTS

| | | | |
|---|---|---|---|
| 8,117,021 B2 | 2/2012 | Atkin et al. | |
| 8,212,811 B2 | 7/2012 | Vartanian | |
| 8,375,393 B2 | 2/2013 | Sankaranarayan et al. | |
| 8,543,368 B1* | 9/2013 | Sznajder | G01R 31/318357 703/14 |
| 8,560,893 B1* | 10/2013 | Hollander | G06F 11/263 714/47.1 |
| 8,627,296 B1 | 1/2014 | Picard | |
| 8,826,199 B2 | 9/2014 | Sedaghat et al. | |
| 8,935,573 B2* | 1/2015 | Horsman | G06F 11/3684 714/32 |
| 2002/0112201 A1* | 8/2002 | Flanagan | G06F 11/3608 714/42 |
| 2002/0133806 A1* | 9/2002 | Flanagan | G06F 11/3608 717/123 |
| 2002/0188649 A1 | 12/2002 | Karim | |
| 2005/0010922 A1* | 1/2005 | Czajkowski | G06N 5/003 718/102 |
| 2005/0166095 A1* | 7/2005 | Chander | G06F 9/44589 714/38.13 |
| 2005/0222827 A1* | 10/2005 | Emek | G06N 99/005 703/2 |
| 2006/0168480 A1* | 7/2006 | Chandler | G06F 9/44589 714/38.1 |
| 2007/0033442 A1* | 2/2007 | Tillmann | G06F 11/3684 714/45 |
| 2008/0141233 A1 | 6/2008 | Gurevich et al. | |
| 2009/0018811 A1* | 1/2009 | Paradkar | G06F 11/3684 703/22 |
| 2009/0326907 A1* | 12/2009 | Gulwani | G06F 8/49 703/22 |
| 2010/0251221 A1* | 9/2010 | Nori | G06F 11/3608 717/131 |
| 2010/0318850 A1* | 12/2010 | Copty | G06F 11/263 714/33 |
| 2012/0054138 A1* | 3/2012 | Bin | G06N 5/00 706/46 |
| 2014/0199664 A1 | 7/2014 | Sadeh-Koniecpol et al. | |
| 2014/0201715 A1 | 7/2014 | Aoyama et al. | |
| 2014/0282432 A1* | 9/2014 | Yoshida | G06F 11/3608 717/131 |
| 2014/0298472 A1* | 10/2014 | Kouskoulas | G06F 21/577 726/25 |
| 2015/0007333 A1* | 1/2015 | Bolignano | G06F 11/3608 726/26 |

OTHER PUBLICATIONS

Constantinescu, S., "Hidden permissions manager found Android 4.3, lets you set the rules", Engadget, Jul. 2013, 15 pages, http://www.engadget.com/2013/07/26/new-nexus-7-on-sale-early.
Hoffman, "iOS Has App Permissions, Too: And They're Arguably Better Than Android's", Published Dec. 15, 2013, Copyright © 2006-2014, 4 pages, How-To Geek, LLC., http://www.howtogeek.com/177711/ios-has-app-permissions-too-and-theyre-arguably-better-than-androids.
Unknown, "Z3", CodePlex, Project Hosting for Open Source Software, last modified on Sep. 16, 2014 http://z3.codeplex.com.
Veng, M., "Dependency Injection and Mock on Software and Testing", UPPSALA University, Master Thesis, Department of Informatics and Media, Jun. 2014, 96 pages.
Yan et al.,"A Blocking Probability Estimator for the Multi-Application and Multi-Resource Constraint Problem," 2014 International Conference on Computing, Networking and Communications (ICNC), Feb. 3-6, 2014, pp. 921-926, DOI: 10.1109/ICCNC.2014.6785460.

* cited by examiner

SYNTHESIZING INPUTS TO PRESERVE FUNCTIONALITY

BACKGROUND

The present disclosure relates to computers, and more specifically, to generating an augmented computer program from a source computer program by synthesizing mock inputs to the source computer program that maximize program functionality when input resources are not available.

Computer programs executed on computing systems can require access to resources external to the computer programs in order to perform various functions. A computing system may provide access to these resources in the form of variable inputs. The computing system may, however, restrict access to certain resources due to security and privacy concerns.

SUMMARY

According to embodiments of the present disclosure, a computer implemented method of preserving functionality in a computer program by generating customized mock inputs may include identifying, by at least one processor, a set of functionalities of the computer program, where a first functionality of the set of functionalities has a first input, and a second functionality of the set of functionalities has a second input. The method may also include determining a first and a second constraint respectively on the first and second inputs, where the first constraint defines a set of values of the first input which enables the first functionality, and the second constraint defines a set of values of the second input which enables the second functionality. The method may then include generating a first constraint satisfaction problem including the first and second constraints, and determining whether a first tuple of mock input values exists that satisfy the first constraint satisfaction problem. The method may additionally include providing, in response to determining that the first tuple exists, the first tuple to the computer program as the customized mock inputs.

Various embodiments are directed towards a computer system for preserving functionality in a computer program by generating customized mock inputs, including a functionality identifying module configured to identify a set of functionalities of the computer program, where a first functionality of the set of functionalities has a first input, and a second functionality of the set of functionalities has a second input. The computer system may also include a constraint determining module configured to determine a first and second constraint on the first and second inputs, where the first constraint defines a set of values of the first input which enables the first functionality, and the second constraint defines a set of values of the second input which enables the second functionality. The computer system may further include a solver module configured to generate a first constraint satisfaction problem including the first and second constraints, and to determine whether a first tuple of mock input values exists that satisfy the first constraint satisfaction problem. A mock input integration module of the computer system may also configured to provide, in response to determining that the first tuple exists, the first tuple to the computer program as the customized mock inputs.

Embodiments of the present disclosure are directed towards a computer program product for preserving functionality in a computer program by generating customized mock inputs, the computer program product including a computer readable storage medium having program instructions embodied therewith, wherein the computer readable storage medium is not a transitory signal per se, the program instructions executable by a processing circuit to cause the processing circuit to perform a method of preserving functionality in a computer program by generating customized mock inputs.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
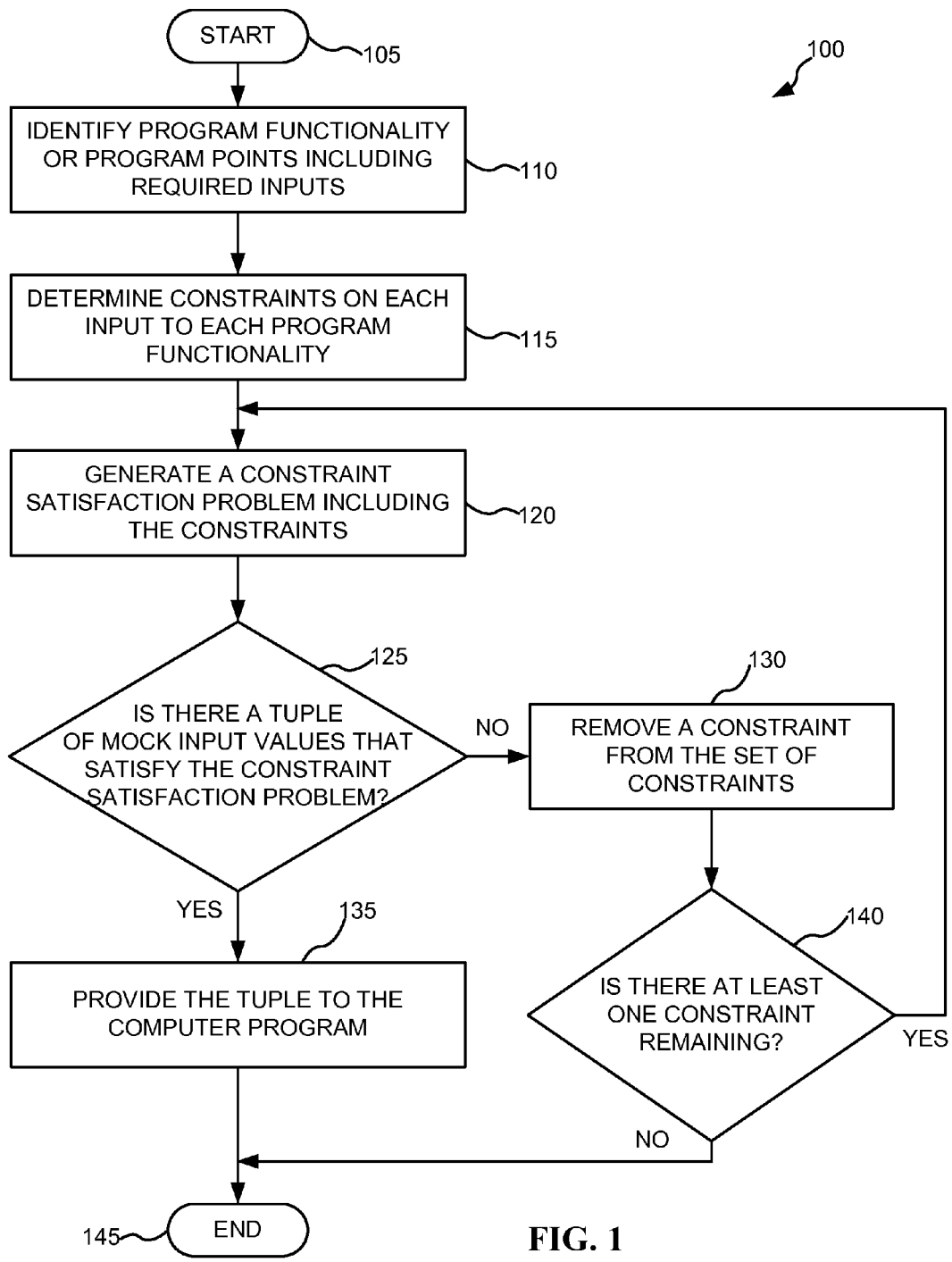
FIG. 1 depicts a flowchart of a method for preserving functionality in a computer program by generating customized mock inputs, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computers, more particular aspects relate to a method, system, and computer program product for preserving functionality in a computer program by generating customized mock inputs when input resources are not available. While the present disclosure is not necessarily limited to such applications, various aspects of the disclosure may be appreciated through a discussion of various examples using this context.

Embodiments of the present disclosure are based on the recognition that security and privacy concerns can cause a computing system to restrict access to resources needed by computer programs to execute certain functionalities. The resource restrictions may be put in place before the computer programs are executed, or they may arise at a time during the computer programs' execution. On some computer systems it may be desirable to have computer programs execute and preserve as much functionality (e.g., to have a computer program be able to perform as many of its functions) as is feasible under these resource restrictions.

Various embodiments of the present disclosure are directed towards a method for (or structured approach to) preserving functionality in a computer program by generating customized simulated inputs (e.g., mock inputs). The method can include identifying the computer program's functionalities or program points (e.g., a program feature) that require inputs from one or more computer system's resources. Next, constraints on the values allowed as inputs to the functionalities can be determined using available techniques, including weakest precondition calculus. A constraint satisfaction problem, including each of the determined constraints, can then be generated. A constraint satisfaction problem solver application can then determine a tuple of mock inputs that satisfy the constraint satisfaction problem. The tuple of mock inputs can then be provided to the computer program to enable a functionality when a resource needed to provide an enabling input is not available. Tuples of input values derived using this method may preserve a maximum amount of functionality in an application when resources are not available due to, for example, security or privacy restrictions.

Particular embodiments of the present disclosure are directed towards a system and computer program product for preserving functionality in a computer program by generating customized mock inputs. The system and computer program product can implement the method described previously using computer hardware and/or software components.

Turning now to the figures, FIG. 1 depicts a flowchart of a method 100 for preserving functionality in a computer program by generating customized mock inputs, according to various embodiments. The method 100 may be implemented on a development computer system (hereinafter "development system") configured to run one or more scripts to perform the methods described herein. According to various embodiments, the development system may begin the method 100 at method step 105 by identifying a source computer program (e.g., a mobile application) whose inputs are to be mocked (e.g., simulated or artificially generated) to enable execution of the source computer program's functionalities on an execution computer system (hereinafter "execution system") as described herein. The source computer program may be identified by, for example, a managing script executing on a processor of the development system. The script may select the source computer program from a database of candidate computer programs.

According to some embodiments, the source computer program may be a computer program configured to run on an execution system where one or more resources providing inputs to the source computer program may be unavailable during the course of the source computer program's execution. In some embodiments, the source computer program may run on an execution system where all required resources are available (e.g., in order to test aspects of the execution system).

An example source computer program can include a smart phone communication application such as Whatsapp. When a user logs in to the Whatsapp application for the first time, the application (e.g., a source computer program) attempts to authenticate the user as the owner of the smart phone (e.g. a computer system). Whatsapp first tries to authenticate the user by short message service (SMS) message to the smart phone from a remote server. Whatsapp then tries to read one of the smart phone's system resource (e.g., the smart phone's "subscriber ID") to authenticate the user. When the SMS authentication fails, Whatsapp tries to authenticate the user through a phone call. When a resource restriction prevents Whatsapp from reading the subscriber ID, Whatsapp can retry the SMS authentication method several times with an idle delay between each try.

The development system may continue the method 100 at method step 110 by identifying one or more functional aspects (e.g., a set of functionalities) of the source computer program along with the inputs that enable each of the functionalities. According to various embodiments, a functionality may include any aspect of a computer program such as a code segment (e.g., a function, procedure, or module) that performs an operation or task. In the Whatsapp example, a functionality may be allowing the smart phone's subscriber to complete the authentication process or proceed to the alternative authentication method (e.g., a phone call), while the input enabling the functionality may be the smart phone's subscriber ID.

According to some embodiments, functionality of the source computer program and its corresponding inputs can be determined by executing the source computer program in a debugger application on the development system. In some embodiments, a given input or set of inputs may enable (or correspond with) multiple functionalities. The development system, including the debugger application, can be configured using the managing script to monitor the source computer program's requests to access system resources while performing input and output (I/O) operations. The development system's configuration can be reused with at least two or more source applications. According to certain embodiments, the I/O operations can include hardware accesses, or message exchanges between computer programs or processes (e.g., software socket communication) executing on the development system. The relationship between one or more input operations and one or more corresponding output operations may correspond with a functionality and its enabling inputs. The relationship can be discovered by, for example, executing the source computer program on a development system at a first time when all requests to access system resources are allowed. The source computer program can then be executed at least a second time while restricting access to certain system resources requested by the source computer program.

In the Whatsapp example, a development system may execute the Whatsapp application a first time while allowing Whatsapp access to the smart phone's subscriber ID, and noting that the application proceeds to at least a second step of the authentication process without idling. The development system can then run the Whatsapp application a second time (e.g., to authenticate a new user) while denying the application access to the smart phone's subscriber ID. The development system can then record the relationship between limiting this system access request and the Whatsapp application failure to proceed to the next step in the authentication process. In some embodiments, the program functionalities or program points, along with corresponding inputs, may be determined by analyzing the computer code for the source computer program (e.g. Whatsapp). In other embodiments, each program functionality or program point, along with corresponding inputs, may be provided to the development system (e.g. by a developer).

The development system, via the managing script, may continue the method 100 at method step 115 by determining a set of constraints on the inputs to the functionalities identified in method step 110. In certain embodiments, a constraint may apply to each input associated with a program functionality (e.g., if a first functionality having a first input and a second functionality having a second and a third input were identified at method step 110, a first constraint would apply to the first input, while a second constraint would apply to the second and the third inputs). A constraint can be a limitation on the values that can be provided as inputs to a computer program to enable a functionality. The constraints may be expressed in mathematical or logical form (e.g., $A<10$, or A AND NOT B, where A and B can be variables that are supplied as input to a computer program to enable a functionality). In some embodiments, constraints on the input values for multiple variables (e.g., where a functionality is enabled by multiple inputs) may be combined algebraically (e.g., in a system of equations having multiple variables) or logically (e.g., using union or intersection operators).

According to various embodiments, a computer program executed by the managing script on the development system, may determine a constraint on the inputs of a functionality heuristically using, for example, weakest precondition calculus. Weakest precondition calculus can be adopted to discover the weakest constraints that ensures that a particular property of a computer program is satisfied. The weakest precondition can be a set of states/preconditions S (e.g. a set of input values) such that a piece of computer code C beginning in any one of the states defined by S is guaranteed to terminate in a state where post-condition Q is true (e.g., S satisfies conditions in the source computer program for enabling a functionality whose inputs are provided by S). The term "weakest" expressly requires that S contain/characterize all the states that guarantee that the computer code C terminates in a state where Q is true. In this way mock input values derived from the constraints determined in method step 110 may be customized (e.g., adapted) for the input requirements of the source computer program. Requiring the weakest precondition may also ensure that the most functionality can be preserved. The set of constraints may be provided to the managing script by the computer program.

The method 100 may be continued at method step 120 where a constraint satisfaction problem (CSP) incorporating the determined set of constraints can be formed by the managing script using the received set of constraints. The constraint satisfaction problem can be a mathematical logic sentence including the set of constraints. In embodiments where each constraint in the set of constraints are written as a logical expression, the expression can be formed by using logic operators to combine each constraint (e.g., C1 & C2 & . . . , where C1 and C2 represent a first constraint and a second constraint respectively). A solution to the CSP can include a set of input values that collectively satisfy each constraint (e.g., that result in the expression being logically true).

The method 100 can be continued at method step 125 with the search for a solution to the constraint satisfaction problem formed in method step 120. The managing script executing on the development system may configure and execute one or more software solvers, such as a Satisfiability Modulo Theories (SMT) solver, to search for solutions to CSPs. A solution to the CSP may include a tuple of mock input values that satisfy the result in the logical expression including the input constrains being logically true. Each input value in the tuple may correspond with an input for enabling a given functionality of the source computer program. The method 100 may be continue at method 130 when a solution satisfying the CSP cannot be found, while the method 100 may be continued at method step 135 when a tuple satisfying the CSP is found.

At method step 130, the managing script may remove a constraint from the set of constraints used to generate the constraint satisfaction problem in method step 120. The CSP solver may provide an indication to the managing script as to which constraint could not be satisfied (e.g., a constraint that was preventing the solver from finding a solution to the CSP). The unsatisfiable constraint can then be removed from the set of constraints by the managing script or, in some cases, the solver. Next, at method step 140, the managing script may determine whether there is at least one constraint remaining in the set of constraints. When the managing script determines that there is not at least one constraint remaining in the set of constraints, the managing script may cause the development to signal that a solution to the CSP cannot be found and then end the method 100 at method step 145. When there is at least one constraint remaining, the managing script may return to method step 120 and generate new constraint satisfaction problem using the set of remaining constraints. The method 100 may then be continued from method step 120.

When the managing script finds, at method step 125, a tuple having mock input values satisfying the CSP, the managing script may continue the method 100 at method step 135 where the managing script provides the tuple of mock input values to the source computer program. According to some embodiments, the managing script can provide the tuple of mock input values to the source computer program by modifying the source computer program's computer code to generate a new computer program which provides the mock input values when a hardware resource is unavailable. The managing script may then end the method 100 at method step 145.

Figure 2:
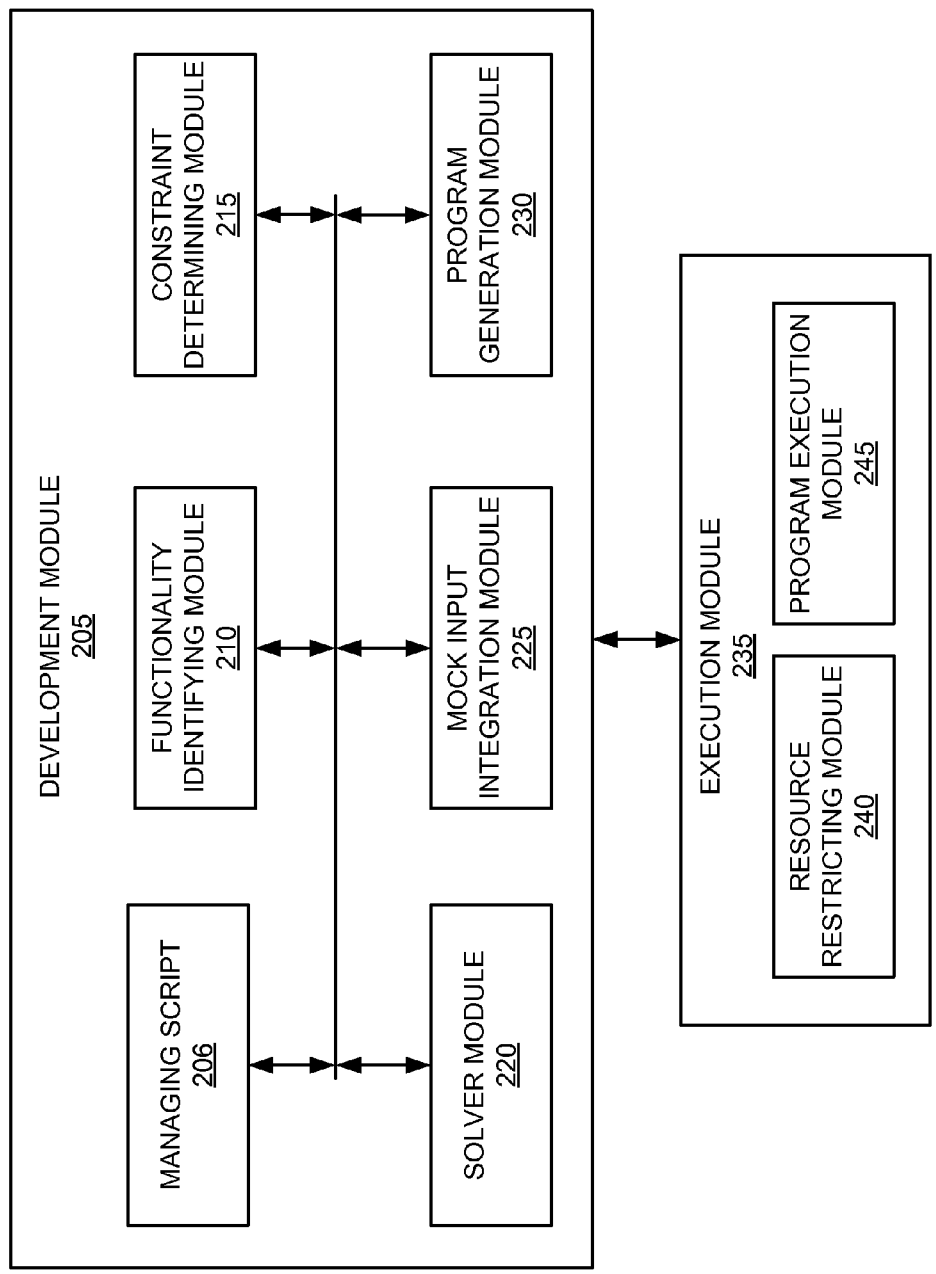
FIG. 2 depicts a block diagram of a system for preserving functionality in a computer program by generating customized mock inputs, according to various embodiments.

FIG. 2 depicts a block diagram of a development system 200 for preserving functionality in a computer program by generating customized mock inputs, according to various embodiments. The system may include development module 205 and execution module 235. Development module 205 and the execution module 235 may each be implemented on one or more computer system/device (e.g., computing device 400 of FIG. 4 described infra) having, for example, software development tools (e.g., compilers, debuggers, and assemblers), software scripting tools, and applications for analyzing and solving mathematical, logical, and statistical problems. In some embodiments, the development module may include managing script 206, a functionality identifying module 210, one or more constraint determining modules 215, a solver module 220, a mock input integration module 225, and a program generation module 230. The execution module 235 may be a computer system (e.g., the same system as the development system, or a different system, such as a smart phone), and may include a resource restricting module 240, and a computer program execution module 245.

The managing script 206 may be a computer script writing in one or more computer readable or interpretable languages. The managing script may interface with a database of computer application on the development system, and may control the configuration of, and the exchange of information between each of the modules (along with the components of each module) in the development system.

The functionality identifying module 210 may include software applications and/or hardware circuits configured to identify one or more functional aspects (e.g., functionalities) of a source computer program along with enabling inputs, as described herein. The functionality identifying module 210 may include a computer code debugger application which may be able to execute, interrupt the execution of, and/or monitor I/O operations performed by the source computer program. In some embodiments, the functionality identifying module may interface with the execution system 235 to, for example, identify a program functionality and associated enabling inputs. In certain embodiments, the functionality identifying module 210 may receive information about the source computer program's functionalities (e.g., the enabling inputs, outputs, and associated code segments). According to various embodiments, the functionality identifying module 210 may provide a set of identified functionalities and associated inputs to the development module 205.

As used herein, interactions with the development module (e.g., providing an input to, or receiving an input from development module) is managed automatically by the managing script 206.

The constraint determining module 215 may include software applications and/or hardware circuits configured to receive a set of identified source computer program functionalities and determine a constraint on at least one input of one or more of the received functionalities, as described herein. The constraint identifying module 215 may be configured to determine a set of constraints on the input to the received functionalities by performing weakest precondition calculus using, for example, an iterative technique where a range of input values are provided to an application, and the impact each value has on enabling a functionality of the application is analyzed. Consequently, the constraint identifying module 215 may also include a computer program debugger application along with components configured to manipulate the input values provided to the source application. In some embodiments, the constraint determining module may interface with the execution module 235. According to various embodiments, the constraint determining module 210 may provide the determined set of constraints to the development module 205.

The solver module 220 may include one or more solver applications (e.g., a SMT solver). In some embodiments, the solver module 220 may receive a set of constraints from the development module, and use the set of constraints to generate a constraint satisfaction problem, as described herein. In other embodiments, the solver module 220 may receive a CSP (e.g., a first constraint satisfaction problem) from the development module (e.g., the CSP can be provided by a software developer, or the constraint determining module 215). The solver module 220 may be configured to iteratively solve a CSP for a tuple of mock input values that can be provided to the source computer program. Iteratively solving a CSP may include a first step of searching for a solution to the CSP using the solver application. When a solution is not found in the first step, a second step may include removing a constraint from the set of constraints used to generate the CSP, and then generating a new CSP (e.g. a second constraint satisfaction problem) from the remaining constraints. Then next step then includes repeating the first and the second step until either a tuple of mock input satisfying the CSP is found, or there are not remaining constraints. When a tuple of mock inputs satisfying the CSP is found, the solver module 220 may provide the tuple to the development module 205.

Mock input integration module 225 may include software applications and/or hardware circuits configured to receive a tuple of mock input values from the solver module, and integrate the input values into the source computer program. Integrating the inputs may include determining segments of the source computer program's code that can be modified to provide the inputs when access to a computer system's resources is not available. Additionally, integrating the inputs may include modifying the source computer program's code to provide the inputs. Referring to the Whatsapp example, integrating the mock inputs may include modifying the Whatsapp application (e.g., change the computer code) to first determine whether access to the smart phone's subscriber ID is available and then, when access is not available, bypass the wait for the resource access request to be fulfilled and provide a valid mocked subscriber ID string to the application. According to some embodiments, the mock inputs may be integrated (e.g. hardcoded) in the computer code, or the computer may be configured to read the mock inputs from a source external to the modified computer program (e.g., a data file). The mock input integration module 225 may provide the modified computer code, along with any supporting data files to the development module 205.

Program generation module 235 may include software applications and/or hardware circuits configured to receive the modified computer code and generate a new computer program (e.g., computer readable/executable code) that can use the mocked input values when access to system resources is not available. The program generation module may include computer readable code generating software applications such as compilers, and assemblers. Generating the new computer program may include, for example, compiling, linking, and/or assembling the modified computer code. The program generation module may provide the new computer executable program to the development module 205. In some embodiments the mock input integration module 230 and the program generation module 235 may be a single module.

The resource restricting module 240 may include software applications and/or hardware circuits configured to restrict access (e.g., prevent an application from reading, modifying, or writing) to certain system resources. In the Whatsapp example, a resource restricting module may prevent the Whatsapp application from reading the smart phone's subscriber ID (for example, when a request is made to read the subscriber ID, the resource restricting module 240 may return a null string to the Whatsapp application). In some embodiments, the resource restricting module may return invalid data to an application that tries to access a restricted resources. In other embodiments, the resource restricting module may notify the application that access to the resource is restricted.

Program execution module 245 can include software applications and/or hardware circuits configured to load and execute a computer program, such as the source computer program and the new computer program generated by program generation module 230. In some embodiments, the program execution module may include components configured to determine which resources are restricted.

Figure 3:
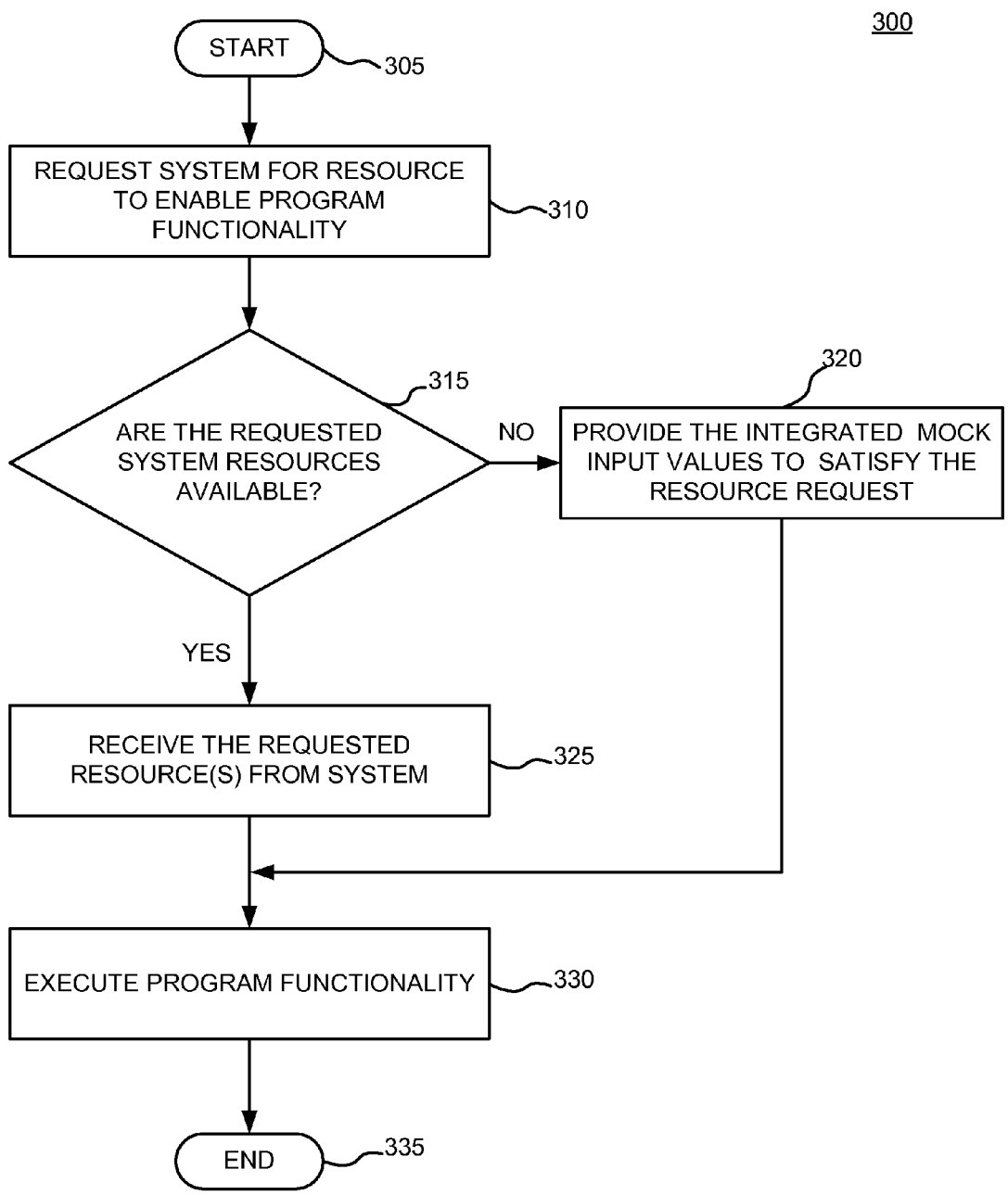
FIG. 3 depicts a flow chart of a method for executing a program having mock inputs, according to various embodiments.

FIG. 3 depicts a flow chart of a method 300 for executing a computer program (e.g., the new computer program generated by the development system 200) having mock inputs, according to various embodiments. The method 300 may be executed on a computing system/device (e.g., the development system 205 or execution system 235, described in FIG. 2). The computing system may start the method 300 at method step 305 by loading and executing the computer program. The method 300 may be continued at method step 310 where the computer program issues requests access to one or more system resources to enable a functionality of the computer program. When the computer program determines that access to the requested resources is available at method step 315, the computer program may continue the method 300 at method step 325, while the computer program may continue to method step 320 when the computer program determines that the requested resource is not available. In some embodiments, the computer program may determine that a resource not is available by receiving a message from the computing system (e.g., the resource restricting module 240 of FIG. 2) indicating that the resource is not available, or by receiving an invalid input in response to the resource access request.

When a resource requested at method step 310 is available, the computer program may receive the requested resource from the computer system at method step 325.

Alternatively, when a resource is not available, the computer program may proceed to method step 320 and execute the modified computer code added by the mock input integration module and provide the mock input values to satisfy the resource access request. The method 300 may then continue to method step 330 where the functionality enabled by the requested input values can be executed (e.g., in Whatsapp example, the Whatsapp application may stop attempting SMS authentication, and proceed to phone authentication method). The computer program may end the method 300 at method step 335.

Figure 4:
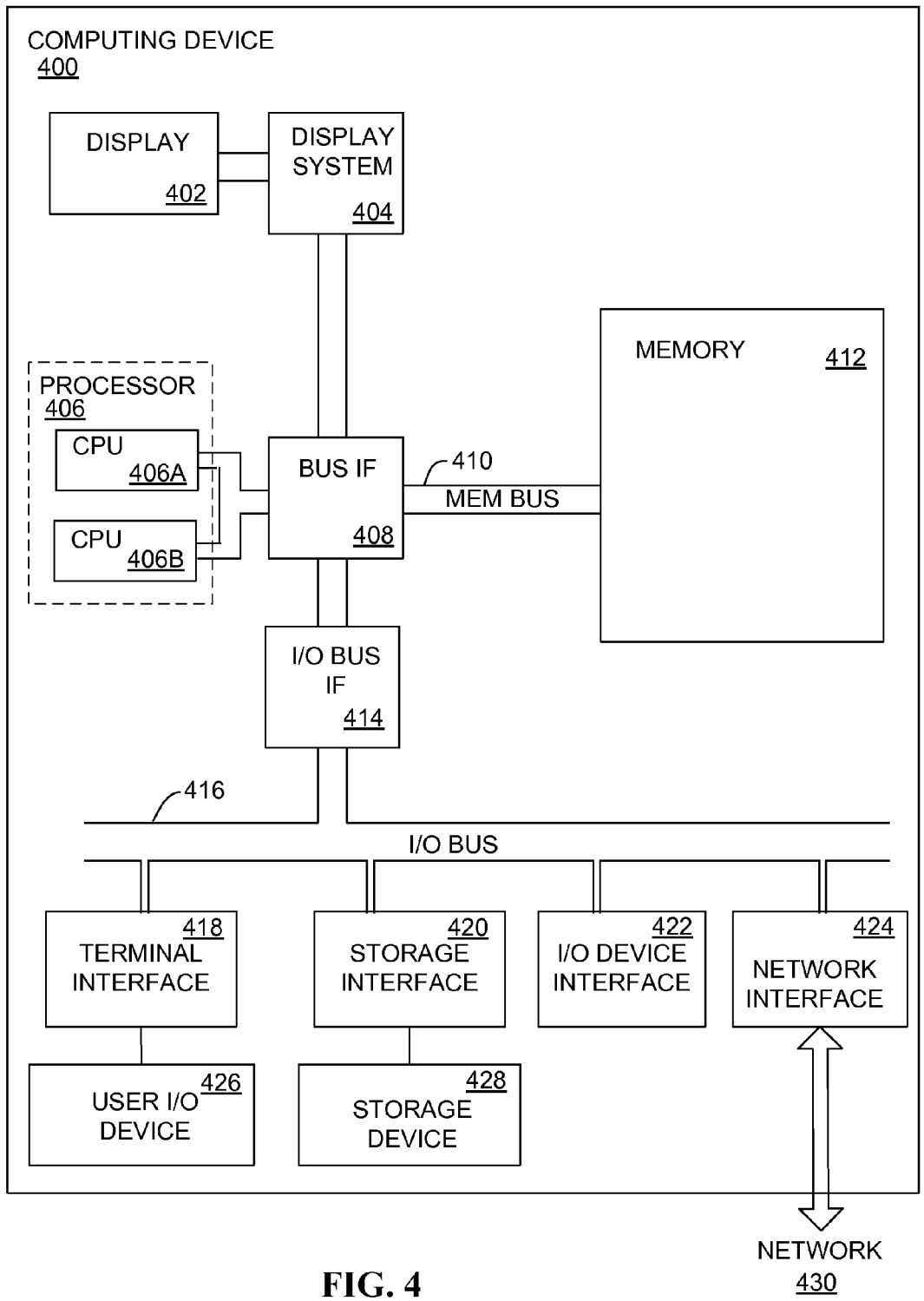
FIG. 4 depicts a block diagram illustrating an exemplary embodiment of a computing device that includes a memory.

FIG. 4 depicts a block diagram illustrating an exemplary embodiment of a computing device that includes a memory. The components of the computing device 400 can include one or more processors 406, a memory 412, a terminal interface 418, a storage interface 420, an Input/Output ("I/O") device interface 422, and a network interface 424, all of which are communicatively coupled, directly or indirectly, for inter-component communication via a memory bus 410, an I/O bus 416, bus interface unit ("IF") 408, and an I/O bus interface unit 414.

The computing device 400 may include one or more general-purpose programmable central processing units (CPUs) 406A and 406B, herein generically referred to as the processor 406. In an embodiment, the computing device 400 may contain multiple processors; however, in another embodiment, the computing device 400 may alternatively be a single CPU device. Each processor 106 executes instructions stored in the memory 412.

The computing device 400 may include a bus interface unit 408 to handle communications among the processor 406, the memory 412, the display system 404, and the I/O bus interface unit 414. The I/O bus interface unit 414 may be coupled with the I/O bus 416 for transferring data to and from the various I/O units. The I/O bus interface unit 414 may communicate with multiple I/O interface units 418, 420, 422, and 424, which are also known as I/O processors (IOPs) or I/O adapters (IOAs), through the I/O bus 416. The display system 404 may include a display controller, a display memory, or both. The display controller may provide video, audio, or both types of data to a display device 402. The display memory may be a dedicated memory for buffering video data. The display system 404 may be coupled with a display device 402, such as a standalone display screen, computer monitor, television, a tablet or handheld device display, or another other displayable device. In an embodiment, the display device 402 may include one or more speakers for rendering audio. Alternatively, one or more speakers for rendering audio may be coupled with an I/O interface unit. In alternate embodiments, one or more functions provided by the display system 404 may be on board an integrated circuit that also includes the processor 406. In addition, one or more of the functions provided by the bus interface unit 408 may be on board an integrated circuit that also includes the processor 406.

The I/O interface units support communication with a variety of storage and I/O devices. For example, the terminal interface unit 418 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 426 and the computing device 400, may receive output data via the user output devices. For example, a user interface may be presented via the user I/O device 426, such as displayed on a display device, played via a speaker, or printed via a printer.

The storage interface 420 supports the attachment of one or more disk drives or direct access storage devices 428 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 428 may be implemented via any type of secondary storage device. The contents of the memory 412, or any portion thereof, may be stored to and retrieved from the storage device 428 as needed. The I/O device interface 422 provides an interface to any of various other I/O devices or devices of other types, such as printers or fax machines. The network interface 424 provides one or more communication paths from the computing device 400 to other digital devices and computer systems.

Although the computing device 400 shown in FIG. 4 illustrates a particular bus structure providing a direct communication path among the processors 406, the memory 412, the bus interface 408, the display system 404, and the I/O bus interface unit 414, in alternative embodiments the computing device 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 414 and the I/O bus 408 are shown as single respective units, the computing device 400, may include multiple I/O bus interface units 414 and/or multiple I/O buses 416. While multiple I/O interface units are shown, which separate the I/O bus 416 from various communication paths running to the various I/O devices, in other embodiments, some or all of the I/O devices are connected directly to one or more system I/O buses.

In various embodiments, the computing device 400 is a multi-user mainframe computer system, a single-user system, or a server computer or similar device that has little or no direct user interface, but receives requests from other computer systems (clients). In other embodiments, the computing device 400 may be implemented as a desktop computer, portable computer, laptop or notebook computer, tablet computer, pocket computer, telephone, smart phone, or any other suitable type of electronic device.

In an embodiment, the memory 412 may include a random-access semiconductor memory, storage device, or storage medium (either volatile or non-volatile) for storing or encoding data and programs. In another embodiment, the memory 412 represents the entire virtual memory of the computing device 400, and may also include the virtual memory of other computer systems coupled to the computing device 400 or connected via a network 430. The memory 412 may be a single monolithic entity, but in other embodiments the memory 412 may include a hierarchy of caches and other memory devices. For example, memory may exist in multiple levels of caches, and these caches may be further divided by function, so that one cache holds instructions while another holds non-instruction data, which is used by the processor. Memory 412 may be further distributed and associated with different CPUs or sets of CPUs, as is known in any various so-called non-uniform memory access (NUMA) computer architectures.

The memory 412 may store all or a portion of the development and execution system's components shown in FIG. 2. The development and execution system's components may include computer programs and data structures configured to implement the methods described in FIG. 1 and FIG. 3. These programs and data structures illustrated in FIG. 2 may be included within the memory 412 in the computing device 400; however, in other embodiments, some or all of them may be on different computer systems and may be accessed remotely, e.g., via a network 430. The development module 205, for example, may be on a first computing devices similar to the computing device 400, while the execution module 240 may be on a second computing device. The computing device 400 may use virtual addressing mechanisms that allow the programs of the computing device 400 to behave as if they only have access to a large, single storage entity instead of access to multiple, smaller storage entities. Thus, while the components and data shown in FIG. 2 are illustrated as being included within the memory 412, these components and data are not necessarily all completely contained in the same storage device at the same time. Although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 406 or instructions or statements that are interpreted by instructions or statements that execute the processor 406 to carry out the functions as further described herein. In another embodiment, the components shown in FIG. 2 may be implemented in hardware via semiconductor devices, chips, logical gates, circuits, circuit cards, and/or other physical hardware devices in lieu of, or in addition to, a processor-based system. In an embodiment, the components shown in FIG. 2 may include data in addition to instructions or statements.

FIG. 4 is intended to depict representative components of the computing device 400. Individual components, however, may have greater complexity than represented in FIG. 4. In FIG. 4, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for generating one or more customized mock inputs to a computer program to enable execution of a set of functionalities of the computer program when resources providing inputs that enable execution of the set of functionalities are unavailable, comprising:
   selecting the computer program from a database of candidate computer programs;
   during a test run of the selected computer program, determining when access to a first resource providing a first input is unavailable and when access to a second resource providing a second input is unavailable;
   identifying, by at least one processor, the set of functionalities, wherein a first functionality of the set of functionalities has the first input, and a second functionality of the set of functionalities has the second input;
   determining a first constraint on the first input, wherein the first constraint defines a set of values of the first input which enables the first functionality;
   determining a second constraint on the second input, wherein the second constraint defines a set of values of the second input which enables the second functionality;
   generating a first constraint satisfaction problem including the first constraint and the second constraint, wherein the first constraint and the second constraint are written as a logical expression including logical operators that combine the first constraint with the second constraint;
   determining that a first tuple of mock input values does not exist to satisfy the first constraint satisfaction problem;
   in response to determining that the first tuple does not exist, performing steps of:
      removing a constraint from the first constraint satisfaction problem;
      generating, in response to the removing, a new constraint satisfaction problem, the new constraint satisfaction problem having at least one fewer constraint than the first constraint satisfaction problem;
      determining whether a new tuple of mock input values exists and satisfies the new constraint satisfaction problem;
      in response to determining that the new tuple does not exist to satisfy the new constraint satisfaction problem, repeating steps of the removing the constraint, generating the new constraint satisfaction problem, and the determining of a new tuple existing to satisfy the new constraint satisfaction problem or all constraints are removed; and
      in response to determining that the new tuple exists to satisfy the new constraint satisfaction problem, integrating the new tuple of mock input values into the computer program by:
         determining modifiable segments of code from the computer program corresponding to one failure, the failure being associated with access to a resource providing the second input;
         modifying the segments of code within the computer program to hardcode the new tuple of mock input values and enable execution of the first functionality and the second functionality, when both the first resource and a second resource are unavailable;
         based on the modified code segments, generating a new computer executable code for the computer program;
         loading the new computer executable code within an execution system;
         executing the new computer executable code within an execution system;
         and
         when both the first resource and the second resource are unavailable during the execution, enabling both the first functionality and the second functionality by providing the new tuple of mock input values to execute the first functionality and the second functionality.

2. The method of claim 1, wherein at least one of the first resource and the second resource is a hardware resource.

3. The method of claim 1, wherein the modifying the segments of code within the computer program to hardcode the new tuple of mock input values includes:
generating computer executable code to modify the segments of code to hardcode at least one element of the new tuple.

4. The method of claim 1, wherein a solver indicates the constraint to remove from the first constraint satisfaction problem.

5. The method of claim 1, wherein at least one of the first constraint and the second constraint is determined using a weakest precondition calculus.

6. The method of claim 1, wherein the first input and the second input are a same input.

7. A computer system, comprising one or more processors, for preserving functionality in a computer program by generating one or more customized mock inputs, the one or more processors configured to:
select the computer program from a database of candidate computer programs;
during a test run of the selected computer program, determine when access to a first resource providing a first input is unavailable and when access to a second resource providing a second input is unavailable;
identify a set of functionalities of the computer program, wherein a first functionality of the set of functionalities has the first input, and a second functionality of the set of functionalities has the second input;
determine a first constraint on the first input, wherein the first constraint defines a set of values of the first input which enables the first functionality;
determine a second constraint on the second input, wherein the second constraint defines a set of values of the second input which enables the second functionality;
generate a first constraint satisfaction problem including the first and second constraints, wherein the first constraint and the second constraint are written as a logical expression including logical operators that combine the first constraint with the second constraint;
determine that a first tuple of mock input values does not exist to satisfy the first constraint satisfaction problem;
in response to determining that the first tuple does not exist, execute steps to:
remove a constraint from the first constraint satisfaction problem;
generate, in response to the removing, a new constraint satisfaction problem, the new constraint satisfaction problem having at least one fewer constraint than the first constraint satisfaction problem;
determining whether a new tuple of mock input values exists and satisfies the new constraint satisfaction problem;
in response to determining that the new tuple does not exist to satisfy the new constraint satisfaction problem, repeating steps of the removing the constraint, generating the new constraint satisfaction problem, and the determining of a new tuple existing to satisfy the new constraint satisfaction problem or all constraints are removed; and
in response to determining that the new tuple exists to satisfy the new constraint satisfaction problem, integrating the new tuple of mock input values into the computer program by executing steps to:
determine modifiable segments of code from the computer program corresponding to one failure, the failure being associated with access to a resource providing the second input;
modify the segments of code within the computer program to hardcode the new tuple of mock input values and enable execution of the first functionality and the second functionality, when both the first resource and a second resource are unavailable;
based on the modified code segments, generating a new computer executable code for the computer program;
load the new computer executable code within an execution system;
execute the new computer executable code within an execution system; and
when both the first resource and the second resource are unavailable during execution, enable both the first functionality and the second functionality by providing the new tuple of mock input values to execute the first functionality and the second functionality.

8. The computer system of claim 7, the computer system is further configured to:
generate computer executable code to modify the segments of code to hardcode at least one element of the new tuple.

9. The computer system of claim 8, wherein a solver module indicates a constraint to remove.

10. The computer system of claim 7, wherein at least one of the first constraint and the second constraint is determined using a weakest precondition calculus.

11. The computer system of claim 7, wherein the first input and the second input are a same input.

12. A computer program product for preserving functionality in a computer program by generating one or more customized mock inputs, the computer program product including a computer readable storage medium having program instructions embodied therewith, wherein the computer readable storage medium is not a transitory signal, the program instructions executable by a processing circuit to cause the processing circuit to perform a method comprising:
selecting the computer program from a database of candidate computer programs;
during a test run of the selected computer program, determining when access to a first resource providing a first input is unavailable and when access to a second resource providing a second input is unavailable;
identifying, by at least one processor, a set of functionalities, wherein a first functionality of the set of functionalities has the first input, and a second functionality of the set of functionalities has the second input;
determining a first constraint on the first input, wherein the first constraint defines a set of values of the first input which enables the first functionality;
determining a second constraint on the second input, wherein the second constraint defines a set of values of the second input which enables the second functionality;
generating a first constraint satisfaction problem including the first constraint and the second constraint, wherein the first constraint and the second constraint are written as a logical expression including logical operators that combine the first constraint with the second constraint;

determining that a first tuple of mock input values does not exist to satisfy the first constraint satisfaction problem;
in response to determining that the first tuple does not exist, performing steps of:
  removing a constraint from the first constraint satisfaction problem;
  generating, in response to the removing, a new constraint satisfaction problem, the new constraint satisfaction problem having at least one fewer constraint than the first constraint satisfaction problem;
  determining whether a new tuple of mock input values exists and satisfies the new constraint satisfaction problem;
  in response to determining that the new tuple does not exist to satisfy the new constraint satisfaction problem, repeating steps of the removing the constraint, generating the new constraint satisfaction problem, and the determining of a new tuple existing to satisfy the new constraint satisfaction problem or all constraints are removed; and
  in response to determining that the new tuple exists to satisfy the new constraint satisfaction problem, integrating the new tuple of mock input values into the computer program by:
    determining modifiable segments of code from the computer program corresponding to one failure, the failure being associated with access to a resource providing the second input;
    modifying the segments of code within the computer program to hardcode the new tuple of mock input values and enable execution of the first functionality and the second functionality, when both the first resource and a second resource are unavailable;
  based on the modified code segments, generating a new computer executable code for the computer program;
  loading the new computer executable code within an execution system;
  executing the new computer executable code within an execution system;
  and
  when both the first resource and the second resource are unavailable during execution, enabling both the first functionality and the second functionality by providing the new tuple of mock input values to execute the first functionality and the second functionality.

13. The computer program product of claim 12, wherein the modifying the segments of code within the computer program to hardcode the new tuple of mock input values includes:
  generating computer executable code to modify the segments of code to hardcode at least one element of the new tuple.

14. The computer program product of claim 12, wherein a solver indicates the constraint to remove from the first constraint satisfaction problem.

15. The computer program product of claim 12, wherein at least one of the first constraint and the second constraint is determined using a weakest precondition calculus.

16. The computer program product of claim 12, wherein the first input and the second input are a same input.

* * * * *